United States Patent [19]
Mast

[11] Patent Number: 5,993,016
[45] Date of Patent: Nov. 30, 1999

[54] OPTICAL REPRODUCTION SYSTEM

[75] Inventor: Fred Mast, Wil, Switzerland

[73] Assignee: Gretag Imaging AG, Regensdorf, Switzerland

[21] Appl. No.: 08/925,402

[22] Filed: Sep. 9, 1997

Related U.S. Application Data

[63] Continuation of application No. 08/115,663, Sep. 3, 1993, abandoned.

[30] Foreign Application Priority Data

Sep. 7, 1992 [EP] European Pat. Off. .............. 92810683

[51] Int. Cl.$^6$ ...................................................... G02B 5/08
[52] U.S. Cl. ........................... 359/861; 359/857; 359/431
[58] Field of Search .................................... 359/857, 858, 359/859, 861, 862, 863, 833, 834, 835, 836, 431, 726, 730; 355/66

[56] References Cited

U.S. PATENT DOCUMENTS

| | | | |
|---|---|---|---|
| 1,552,449 | 9/1925 | Roach | 359/858 |
| 3,790,256 | 2/1974 | Mecklenborg et al. | 359/836 |
| 3,971,066 | 7/1976 | Toda . | |
| 4,013,340 | 3/1977 | Mukai et al. . | |
| 4,103,991 | 8/1978 | Kramer | 359/861 |
| 4,142,800 | 3/1979 | Paget . | |
| 4,252,410 | 2/1981 | Jain | 359/861 |
| 4,545,655 | 10/1985 | Fantone et al. . | |
| 4,557,591 | 12/1985 | Serizawa et al. | 355/40 |
| 4,588,269 | 5/1986 | Kessler | 359/858 |
| 4,592,649 | 6/1986 | Freitag et al. | 355/43 |
| 4,729,071 | 3/1988 | Solomon | 359/861 |
| 4,743,103 | 5/1988 | Estelle | 350/445 |
| 4,929,040 | 5/1990 | Pagano et al. | 350/6.5 |
| 4,960,313 | 10/1990 | Yamanaka | 350/6.1 |
| 5,061,054 | 10/1991 | Ohshita | 359/399 |
| 5,296,972 | 3/1994 | McKinley | 359/861 |

FOREIGN PATENT DOCUMENTS

| | | |
|---|---|---|
| 0142959 | 5/1985 | European Pat. Off. . |
| 0157325 | 10/1985 | European Pat. Off. . |
| 0323845 | 7/1989 | European Pat. Off. . |
| 3248807 | 6/1983 | Germany . |
| 9102995 | 3/1991 | WIPO ..................... 359/861 |

OTHER PUBLICATIONS

"Bauelemente der Optik", H. Naumann/G. Schröder, Carl Hanser Verlag München/Wien 3. Auflage, 1983, p. 171.

*Primary Examiner*—Ricky D. Shafer
*Attorney, Agent, or Firm*—Burns, Doane, Swecker & Mathis, LLP

[57] ABSTRACT

The optical reproduction system comprises an even number (e.g., four) of reflecting surfaces for producing an image rotated 90° relative to an object to be produced, on an image plane that is parallel to the plane of the object. The incoming optical axis and the outgoing optical axis rest on the same straight line.

18 Claims, 9 Drawing Sheets

OPTICAL REPRODUCTION SYSTEM

This application is a continuation, of application Ser. No. 08/115,663 filed Sep. 3, 1993 now abandoned.

BACKGROUND OF THE INVENTION

The present invention relates to an optical reproduction system. Optical reproduction systems which reproduce an object on an image plane parallel to the plane of the object and where the image produced in the image plane is rotated by 90° relative to the object are known to the prior art in numerous designs. Examples are the so-called Dove/Amici prisms, the Abbé/König prism, and the Schmidt/Pechan prism. These reproduction systems differ among themselves significantly in the number of reflecting surfaces they employ (Dove/Amici: 1, Abbé/König : 3, Schmidt/Pechan: 5). But each of them has an odd number of reflecting surfaces, with the result that the produced image is indeed rotated 90° on the image plane relative to the object; in each case, however, the image is also inverted in its orientation (a right-handed system becomes a left-handed system, and vice versa).

Of interest are those reproduction systems which rotate the object 90° and are used in photographic copy machines and photographic processing paths. In the production of copies out of originals, for example from the negatives of a negative film, there are both film frames in full format (full-frame, for example, 24 mm×36 mm) and film frames in half-format (half-frame, for example, 24 mm×18 mm). On the negative film the half-frames are rotated 90° relative to the full-frames due to the uniform film width. In the case of conventional simple exposure on paper, the copied image of the half-frame original would also be rotated by 90° on the paper relative to the image of a full-frame original.

As a rule, films with originals (film frames) in full-frame arise more frequently than films with half-frames that are rotated 90°. Still, films with rotated half-frames are so commonplace today and arise in such large number that for an efficient distribution of load on copy machines or photographic processing paths it must be possible to copy onto the paper the half-frame originals rotated 90°, and in such a way the copies of these half-frame originals rotated 90° have the same position and also the same dimensions on the paper as the copies of full-frame originals.

This requirement quickly becomes obvious: whether the client has shot a film with half-frame or full-frame originals, he will want to receive paper copies, for example, in the particularly popular 9 cm×13 cm format. At the same time, copying with copy machines usually involves first combining the individual films or film strips to form a long tape. This long tape is then processed by exposure onto the paper. Likewise a long tape of photosensitive paper is employed for copies of one and the same format. This long paper tape has a uniform width (always for copies of one and the same format). If an attempt were made to copy both the originals in full-frame and the half-frame originals rotated 90° onto the paper with a single enlargement, the paper width-adjusted to the smaller dimension (for example, 9 cm dimension) of the copies of full-frame originals—would be insufficient for the copies of half-frame originals. Even if the paper width were given adequate dimensions (which for copies of full-frame originals would result in a large excess length on the paper margin), the paper tape would have to be advanced each time a non-uniform distance before the next copy could be cut from the paper tape, depending on whether the next copy on the paper tape was that of a full-frame or a half-frame original inasmuch as the copy of the half-frame original would be copied onto the paper rotated in 90° rotation.

In the past, therefore, copy machines were proposed in which—in the case of half-frame originals rotated 90°—these rotated originals were copied onto the paper in 90° "reverse rotation", and such copies consequently occupy the same position on the paper as copies of full-frame originals that have not been rotated in copying. To be sure, the reproduction systems discussed at the outset are unsuited for this purpose, since—as already mentioned—they have an uneven number of reflecting surfaces, and though they could provide the 90° rotation, the orientation of the objects shown on the originals would be inverted. On the other hand, an even number of reflecting surfaces, which can also provide the 90° rotation, will maintain the orientation of the reproduced objects. Copy machines which have these even number of reflecting surfaces are described in, for example, U.S. Pat. No. 4,743,103 and EP 0,157,325.

The solution described in U.S. Pat. No. 4,743,103, employing two Schmidt/Pechan prisms and a large number of lenses, is disadvantageous in several respects. It is disadvantageous with respect to spatial requirements (a reproduction system for use in copy machines cannot be of any desired size). Primarily, however, the expense with respect to the high precision required for justification of the reflecting surfaces of the prisms with the increasing number of reflections (in the present example the number of reflections is ten) is very high, and a true reproduction of the original by the produced copy is associated with a very high cost—or will otherwise be considerably impaired by a less precise justification of the prisms and their reflecting surfaces.

The variation suggested in EP 0,157,325 comprises a total of six reflecting surfaces, four of which are required to achieve the desired 90° rotation. To be sure, after four reflections the incoming optical axis and the outgoing optical axis of the system would not coincide and the image would consequently be copied in displaced fashion on the paper. Such displacement results in increased paper consumption, since the gaps in the paper tape between copies which are produced from half-frame originals and copies which are produced from full-frame originals are larger than when only copies of full-frame originals are produced. In addition, displacement produces increased expense in terms of the transport means and the cutting device of the corresponding copy machine or photographic processing path: the paper tape must be advanced a differing distance before the next copy can be cut from the paper tape, depending on whether a copy of a full-frame or a half-frame original is the next copy on the paper tape. In order to avoid this kind of displacement and the associated expense, EP 0,157,325 furnishes two additional reflecting surfaces which assure that the image rotated 90° is not copied in displaced fashion but rather in the same position on the paper as the unrotated image of a full-frame original. Additional reflecting surfaces, however, make for an increased spatial requirement, apart from the increased expense represented by the additional mirrors. Most important, however, the expense with respect to the high precision required in justifying the prisms and their reflecting surfaces remains very high, so that a true reproduction of the original by the produced copy can only be achieved at great expense, or at the cost of reduced quality when there is a less precise justification of the prisms and their reflecting surfaces.

SUMMARY OF THE INVENTION

The present invention is therefore directed to creating a reproduction system which rotates the image of a half-frame original by 90° relative to a full-frame original, such that the image of the half-frame original is reproduced on the paper tape in the same position as the image of a full-frame original for which rotation of the image is not necessary. At the same time, the reproduction system should be as inexpensive as possible, particularly with respect to the degree of precision necessary in justifying the required reflecting surfaces. The invention solves this problem with an optical reproduction system that comprises as few as four reflecting surfaces. Here the reflecting surfaces are arranged in a special manner. The first reflecting surface in the optical path produces an initial mirror image of the incoming optical axis. This initial mirror image of the incoming optical axis, along with the incoming optical axis, defines a first plane. The second reflecting surface that follows the first reflecting surface in the optical path produces a second mirror image of the incoming optical axis, and this second mirror image of the incoming optical axis leaves the first plane. The first and second mirror images of the incoming optical axis thus define a second plane different from the first plane. The third reflecting surface that follows the second reflecting surface in the optical path produces a third mirror image of the incoming optical axis, and this third mirror image of the incoming optical axis leaves the second plane and intersects the extension of the incoming or outgoing optical axis. The fourth reflecting surface following the third reflecting surface in the optical path finally produces a fourth reflecting image of the incoming optical axis, which coincides with the outgoing optical axis. By using only four reflecting surfaces, expense is minimized with regard to the number of necessary reflecting surfaces, and particularly with regard to the necessary high precision (small tolerances) required for their justification.

The reflecting surfaces are arranged in differing fashion in various advantageous embodiments of the invention. The incoming optical axis defines an angle of incidence of 45° to 60° with respect to the perpendicular to the first reflecting surface. The perpendicular to the second reflecting surface has an azimuth of 45° to 120° relative to the first plane, and an elevation of 40° to 70° relative to the azimuth plane. The perpendicular to the third reflecting surface has an azimuth of 60° to 85° relative to the first plane and an elevation of −10° to 45° relative to the azimuth plane, and the perpendicular to the fourth reflecting surface has an azimuth of 120° to 160° relative to the first plane and an elevation of −15° to −45° relative to the azimuth plane.

In a particularly advantageous embodiment the incoming optical axis defines an angle of incidence of 60° with respect to the perpendicular to the first reflecting surface. In this embodiment the perpendicular to the second reflecting surface has an azimuth of 109° to 110° relative to the first plane, specifically an azimuth of 109.734°, and an elevation of 64° to 65° relative to the azimuth plane, specifically an elevation of 64.296°. The perpendicular to the third reflecting surface has an azimuth of 70° to 71° relative to the first plane, specifically an azimuth of 70.529° and an elevation of 16° to 17° relative to the azimuth plane, specifically an elevation of 16.779°. Finally, in this embodiment the perpendicular to the fourth reflecting surface has an azimuth of 149° to 151° relative to the first plane, specifically an azimuth of 150°, and an elevation of −35° to −36° relative to the azimuth plane, specifically an elevation of −35.260°.

In this embodiment the ratio of the lengths of the optical paths from the first reflecting surface to the second surface, from the second to the third surface, and from the third to the fourth surface is ($\sqrt{2}$): 1:1 wherein ($\sqrt{2}$) represents the square root of 2.

In another advantageous embodiment the reproduction system according to the invention comprises first and second identical half-systems, each with two reflecting surfaces. The second half-system is arranged in such a way that its configuration is derived from that of the first half-system in that the first half-system is reflected onto a separating plane that is vertical to the optical axis and the reflected first half-system is then rotated a given angle around the outgoing optical axis.

In another particularly advantageous embodiment or further elaboration of the embodiment just explained, the incoming optical axis defines an angle of incidence of 60° with respect to the perpendicular to the first reflecting surface. The perpendicular to the second reflecting surface has an azimuth of 109° to 100° relative to the first plane, specifically an azimuth of 109.735°, and an elevation of 64° to 65° relative to the azimuth plane, specifically an elevation of 64.296°. In addition, in this embodiment the perpendicular to the third reflecting surface has an azimuth of 81° to 82° relative to the first plane, specifically an azimuth of 81.548° and an elevation of −4° to −5° relative to the azimuth plane, specifically an elevation of −4.850°. Finally, the perpendicular to the fourth reflecting surface has an azimuth of 121° to 122° relative to the first plane, specifically an azimuth of 121.482°, and an elevation of −16° to −17° relative to the azimuth plane, specifically an elevation of −16.778°.

In this embodiment the ratio of the lengths of the optical paths from the first reflecting surface to the second surface, from the second to the third surface, and from the third to the fourth surface is 1:($\sqrt{2}$):1.

In another particularly advantageous embodiment of a reproduction system according to the invention, the incoming optical axis defines an angle of incidence of 45° with respect to the perpendicular to the first reflecting surface. The perpendicular to the second reflecting surface has an azimuth of 138° to 139° relative to the first plane, specifically an azimuth of 138.093°, and an elevation of 44° to 46° relative to the azimuth plane, specifically an elevation of 45°. The perpendicular to the third reflecting surface has an azimuth of 64° to 65° relative to the first plane, specifically an azimuth of 64.082° and an elevation of 31° to 32° relative to the azimuth plane, specifically an elevation of 31.821°. Finally, the perpendicular to the fourth reflecting surface has an azimuth of 154° to 155° relative to the first plane, specifically an azimuth of 154.241°, and an elevation of −38° to −39° relative to the azimuth plane, specifically an elevation of −38.268°.

In this embodiment the ratio of the lengths of the optical paths from the first reflecting surface to the second surface, from the second to the third surface, and from the third to the fourth surface is 1:0.7:1.1417. For example, a standardized length of the optical path with a dimension figure of 1 is about 35—35 mm, more specifically about 40 mm. The reflecting surfaces may be designed as total reflection surfaces. When the reflecting surfaces are designed as discrete surfaces, they can be realized in the form of a metallically coated glass surface, with a refraction index of about 1.7 for the employed glass.

It is also possible, however, for the reproduction system to encompass one or a plurality of glass bodies, on which appropriately positioned reflection surfaces are provided. After entering the glass body, the light will be conducted within the body. As long as the angle of incident light to the given reflecting surface (mirroring surface) is larger than the critical angle at which total reflection occurs, the surfaces do not need to be metal-coated. If the value drops below this critical angle, however, the reflecting surface must be metal-coated.

As an optional feature, a lens can be provided to compensate for chromatic defects and/or optical defects of a geometric kind (e.g., spherical aberration); such a lens may be positioned in front of the first reflecting surface or behind the fourth reflecting surface.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
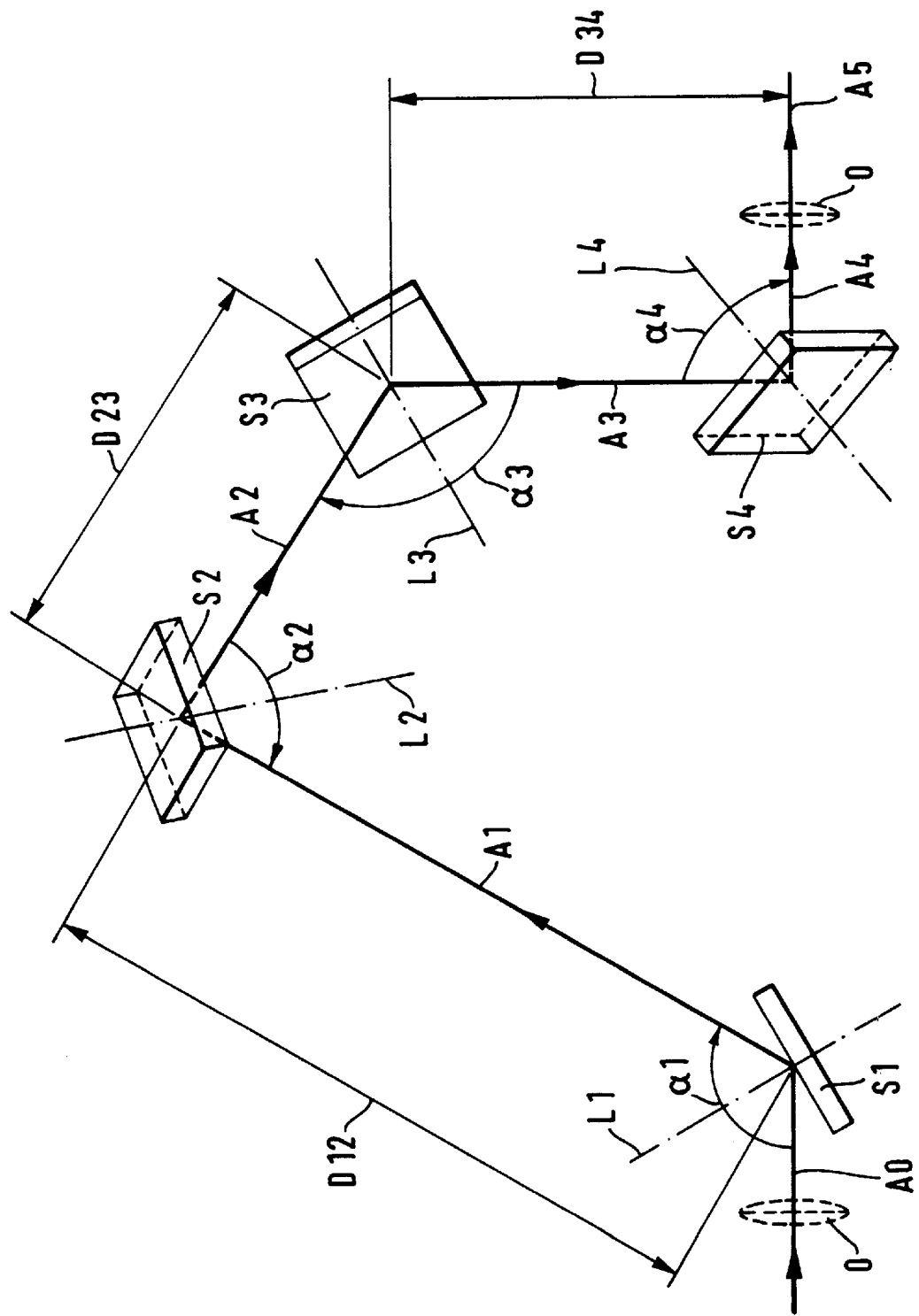
FIG. 1 shows a first embodiment of a configuration of reflecting surfaces of a reproduction system according to the invention.
Figure 1A:
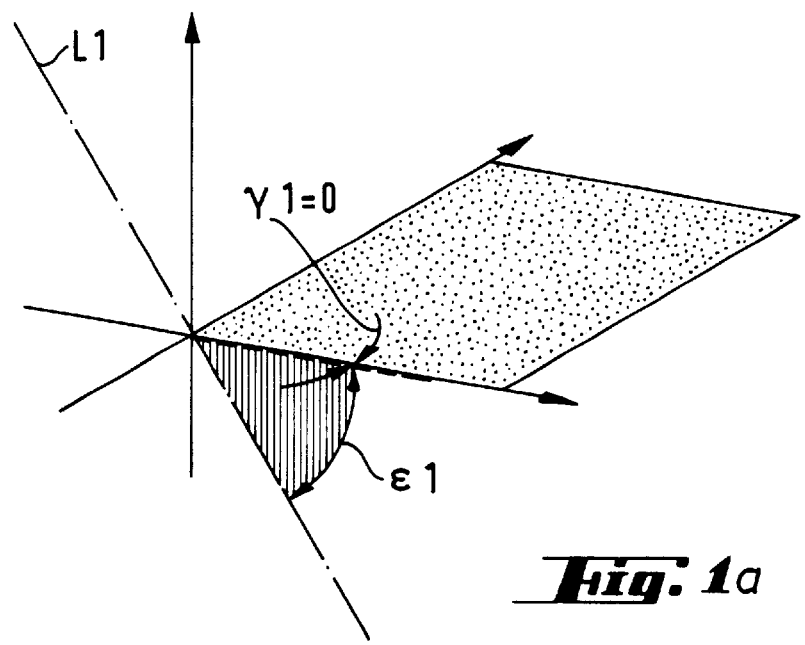
FIGS. 1a–d show the position of a perpendicular to each of individual reflecting surfaces in succession along a path of a light ray, according to a first embodiment of the reproduction system.
Figure 1B:
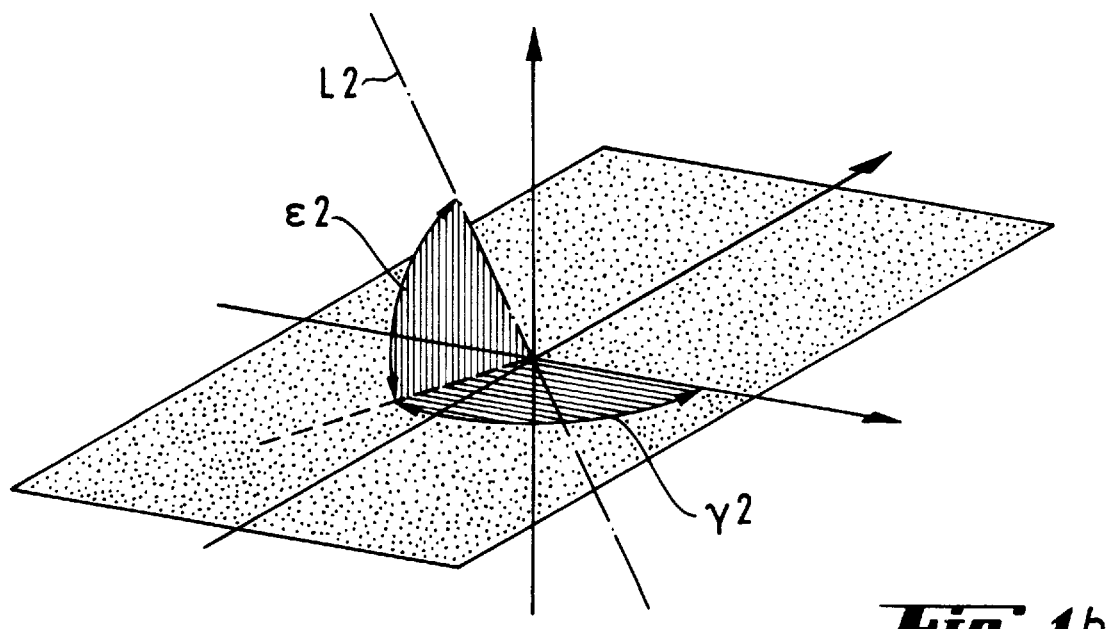
Figure 1C:
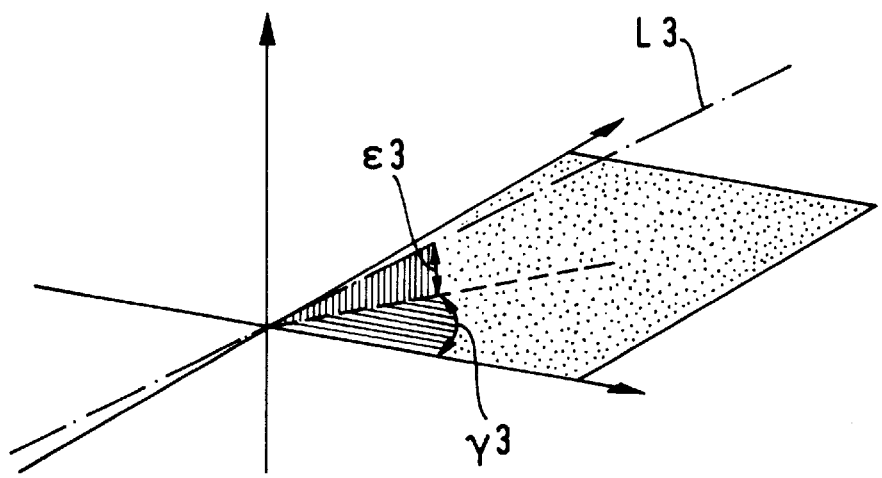
Figure 1D:
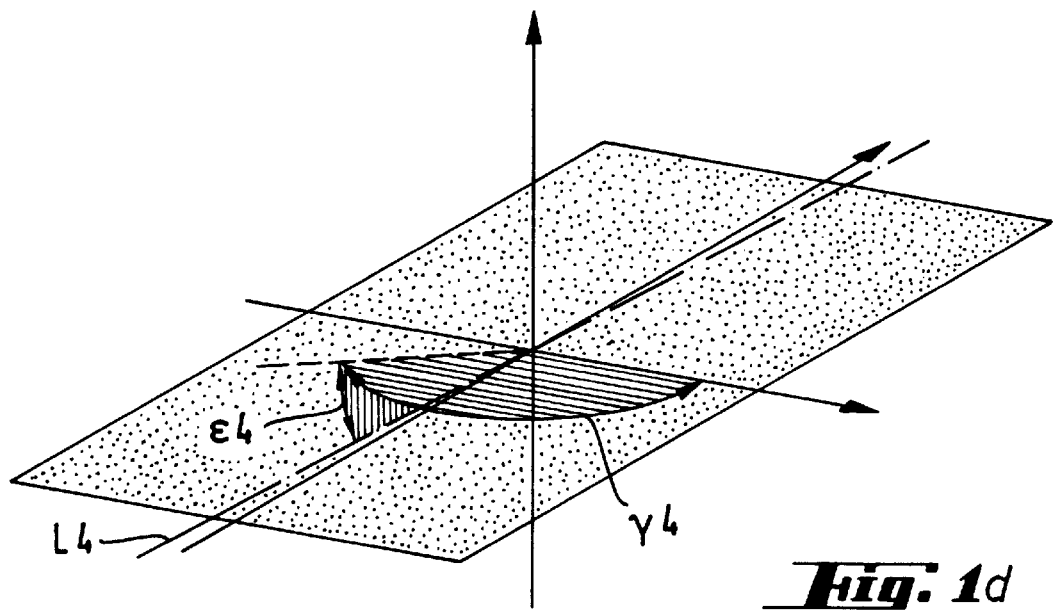
Figure 2:
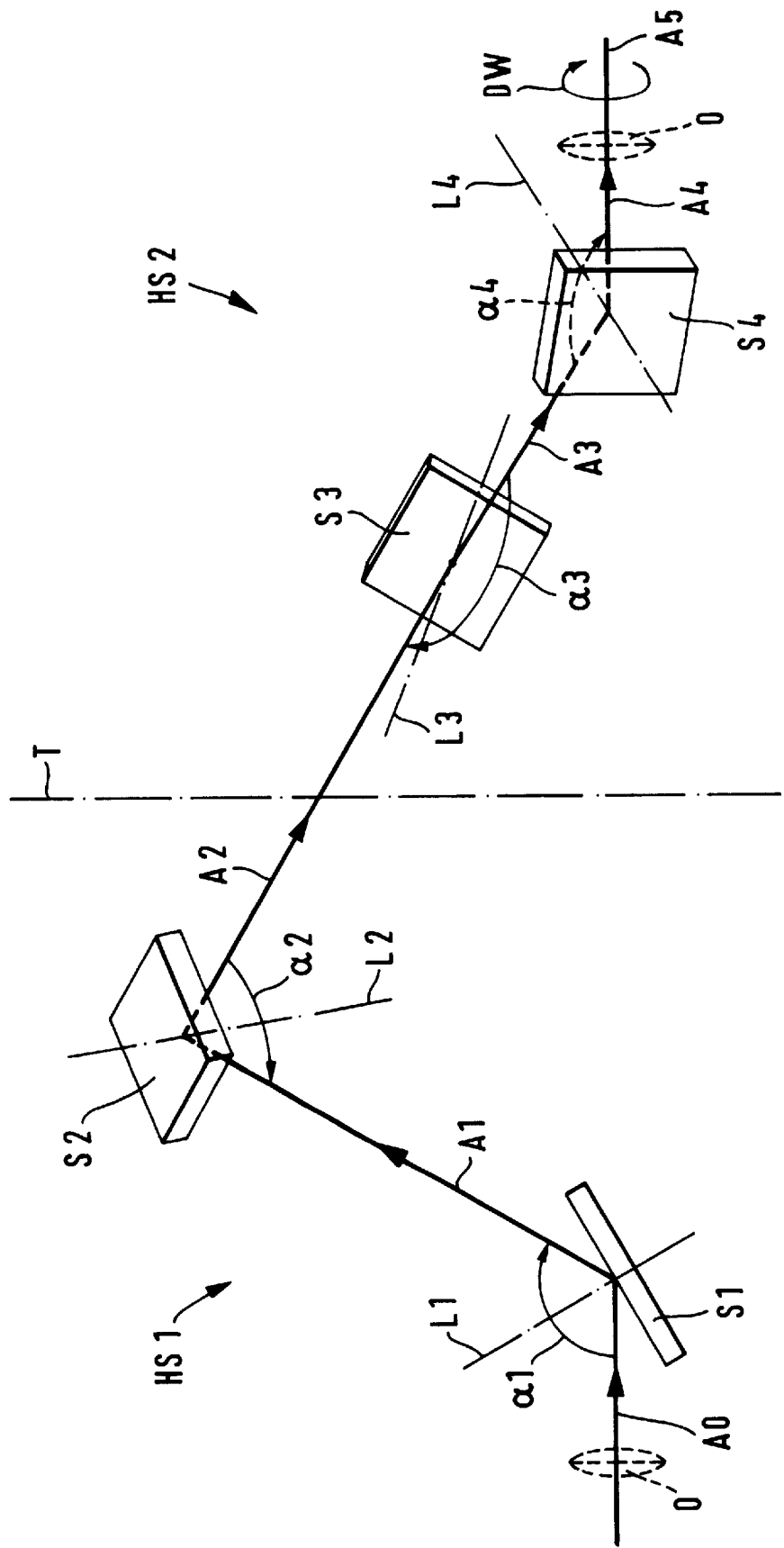
FIG. 2 shows a second embodiment of a configuration of reflecting surfaces of a reproduction system according to the invention.
Figure 2A:
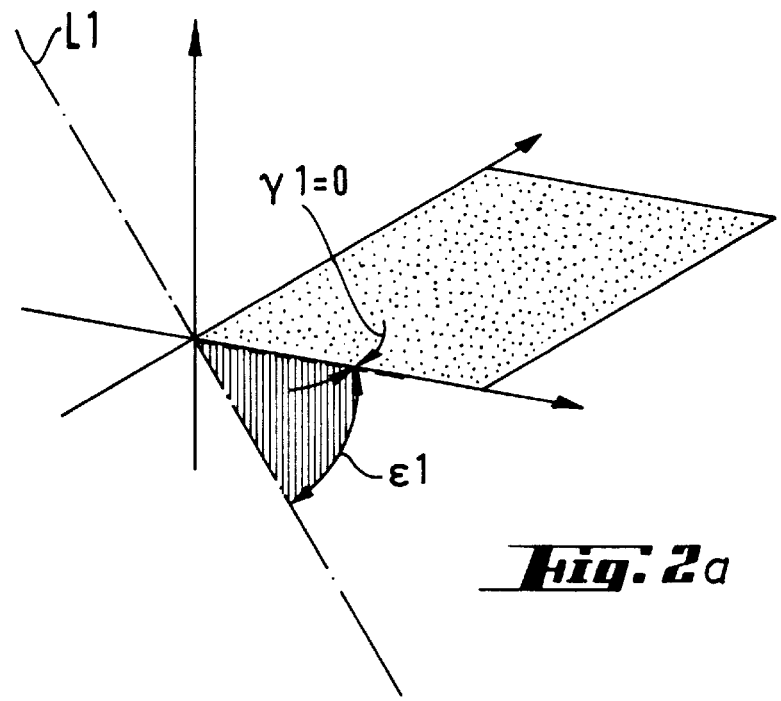
FIGS. 2a–d show the position of a perpendicular to each of the individual reflecting surfaces in succession along the path of the light ray, according to the second embodiment of the reproduction system.
Figure 2B:
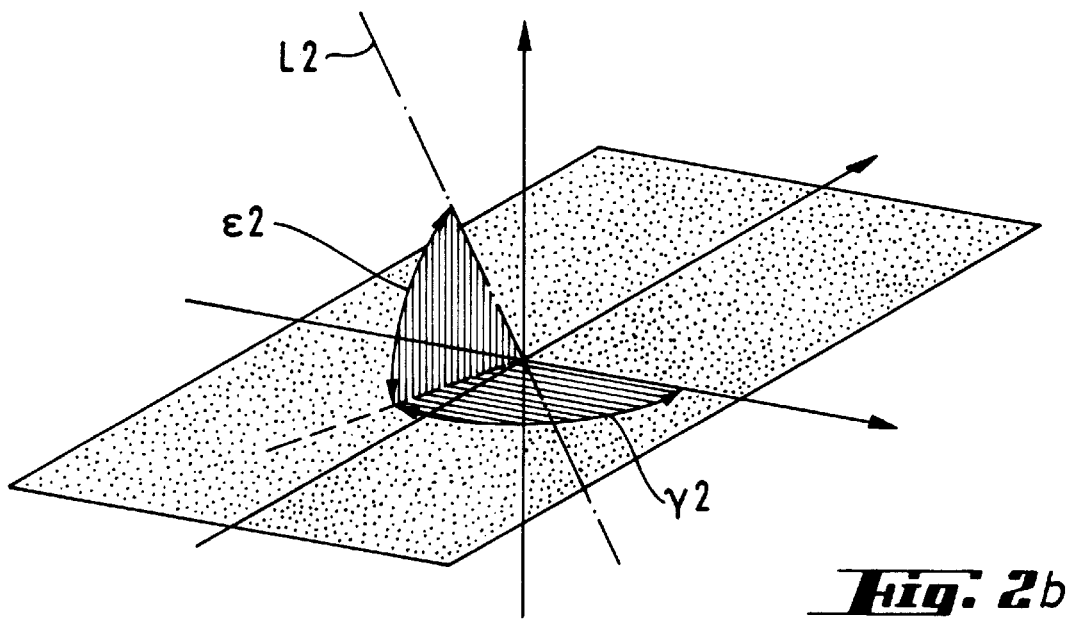
Figure 2C:
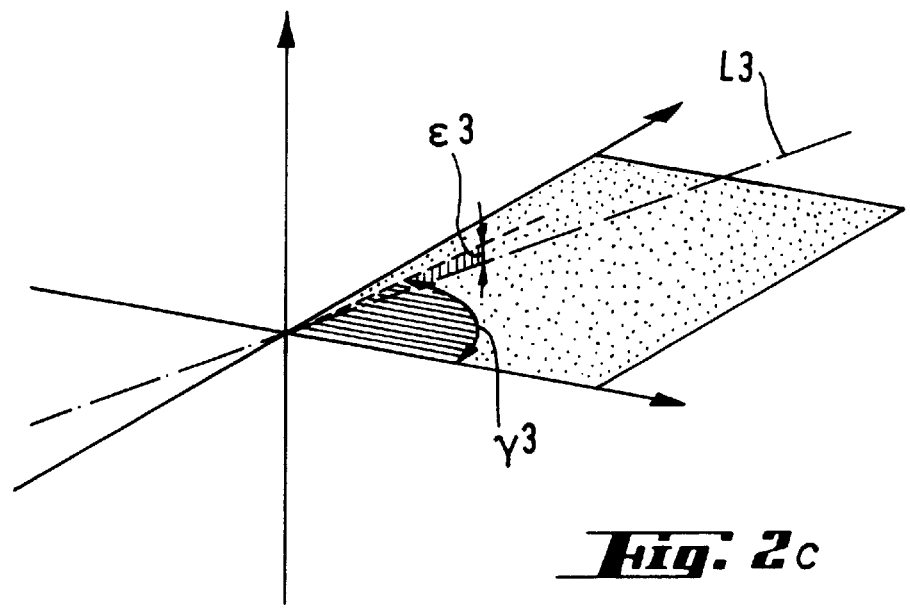
Figure 2D:
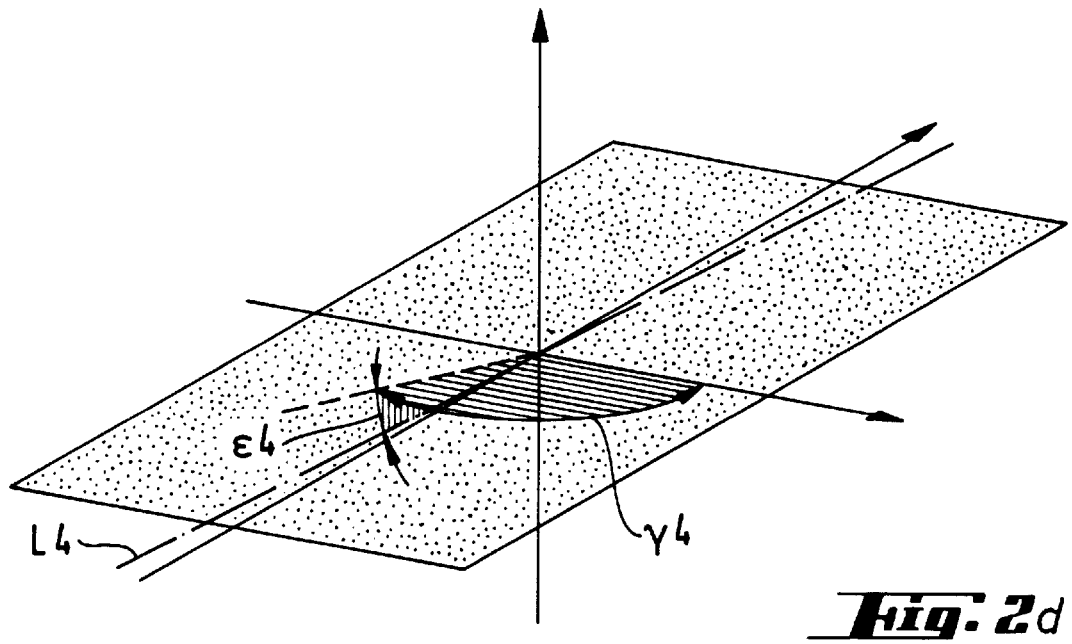
Figure 3:
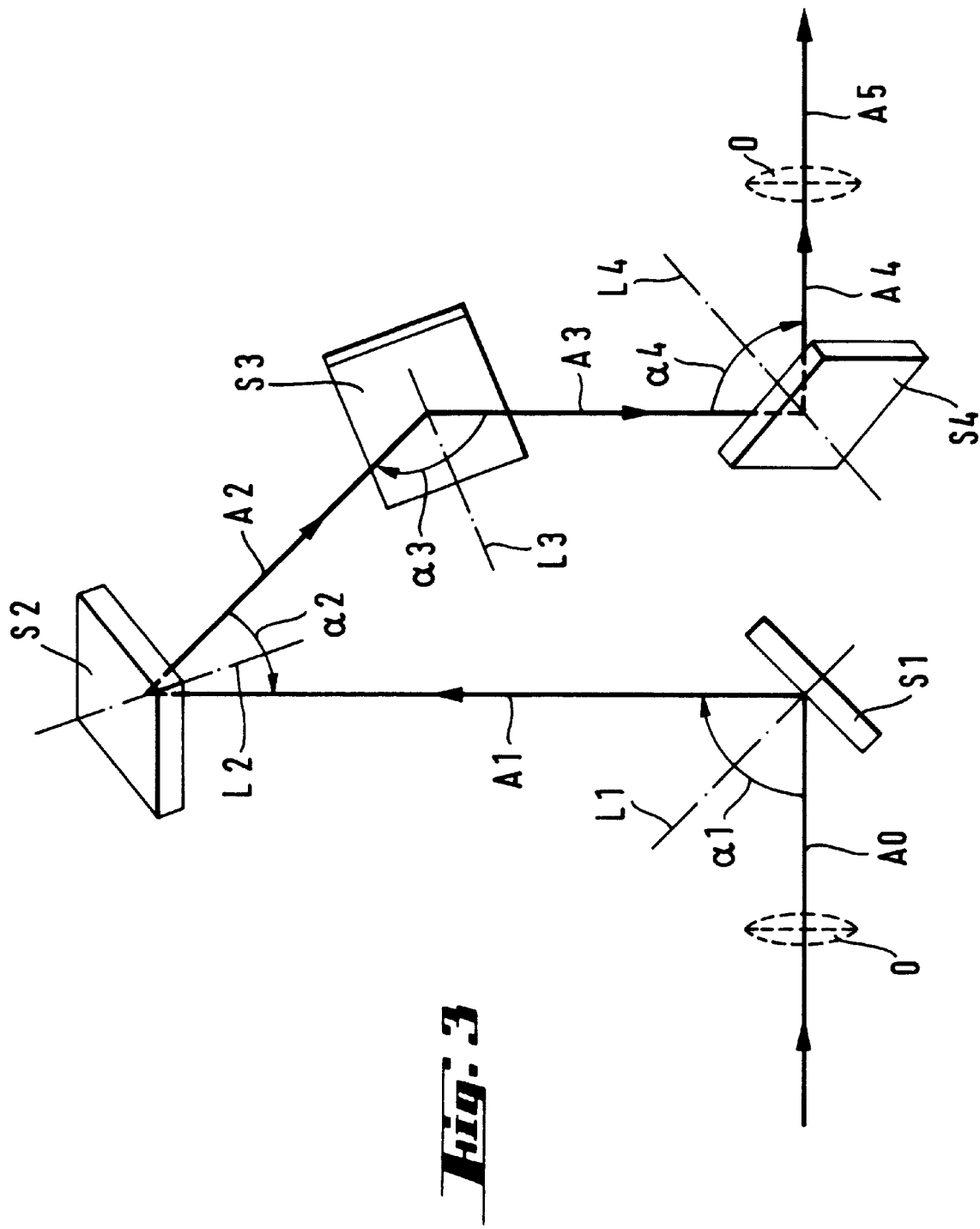
FIG. 3 shows a third embodiment of a configuration of reflecting surfaces of a reproduction system according to the invention.
Figure 3A:
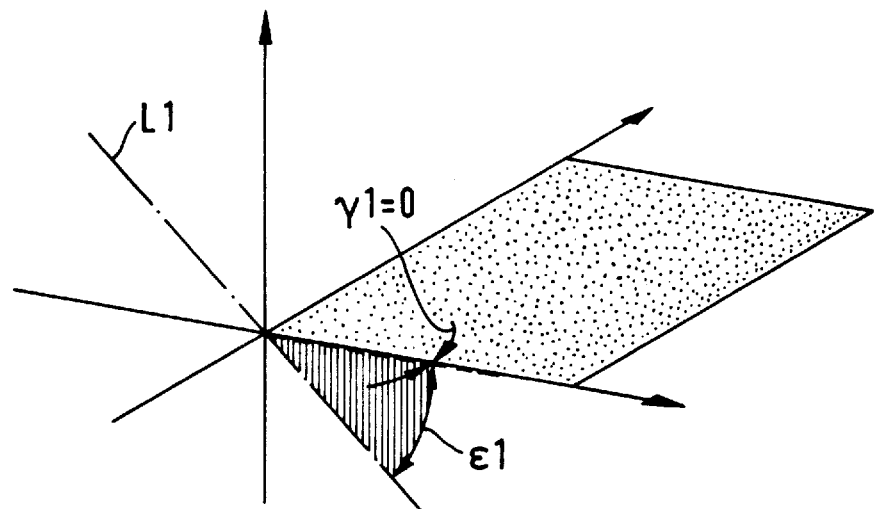
FIGS. 3a–d show the position of a perpendicular to the individual reflecting surfaces in succession along the path of the light ray, according to a third embodiment of the reproduction system.
Figure 3B:
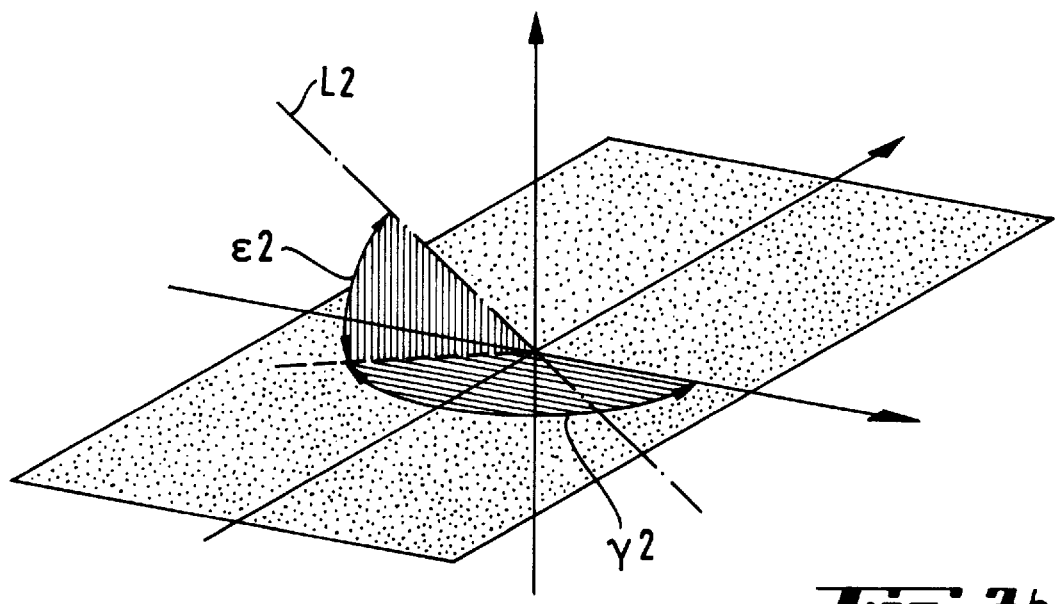
Figure 3C:
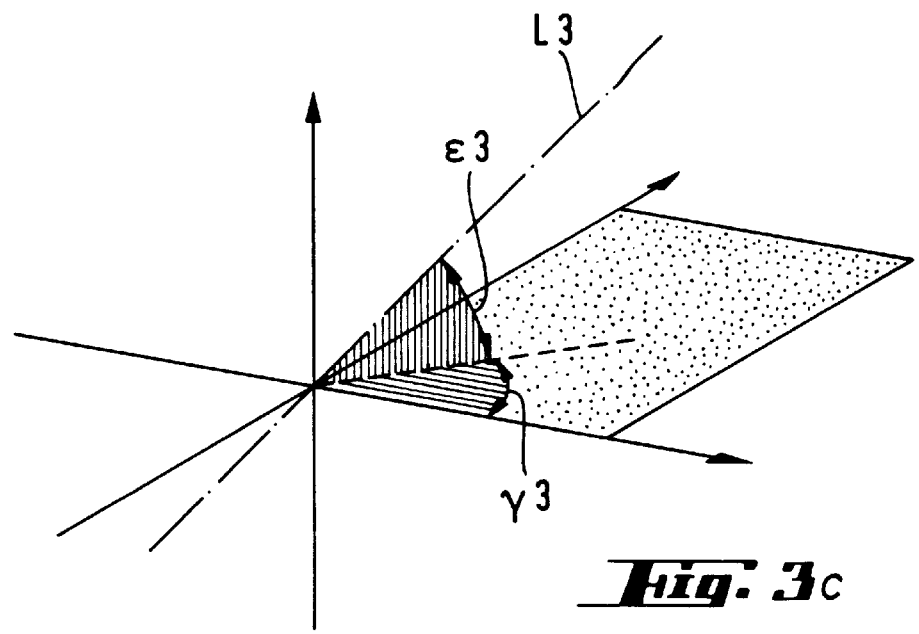
Figure 3D:
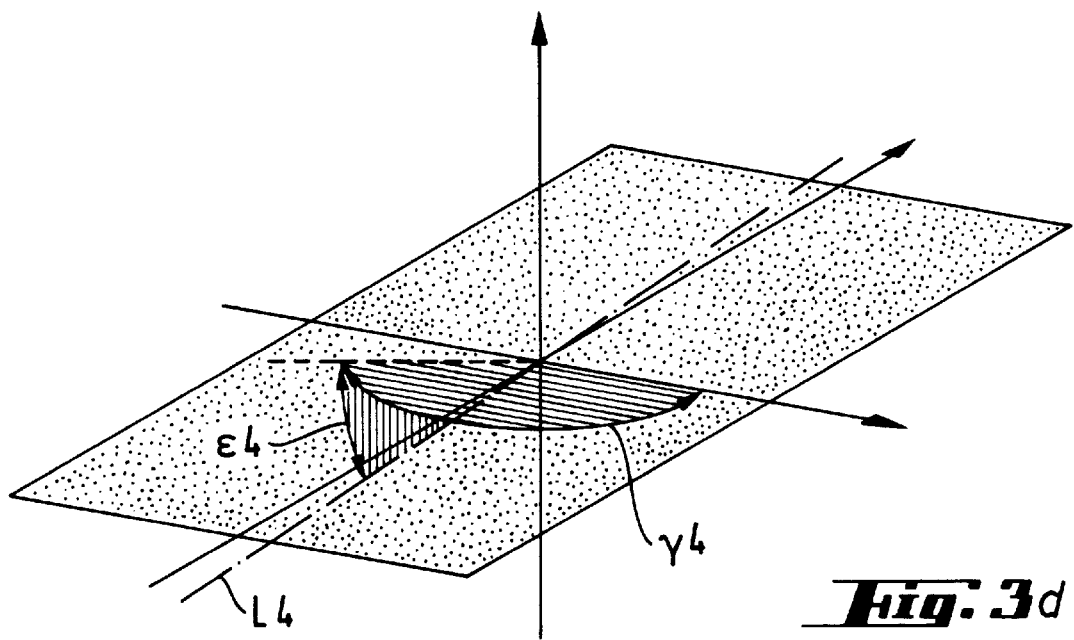

In FIGS. 1, 2, and 3, S1 designates a first reflecting surface in an optical path, S2 a second reflecting surface in the optical path, S3 a third reflecting surface in the optical path, and S4 a fourth reflecting surface in the optical path. L1, L2, L3, L4 in FIGS. 1a–d, 2a–d, and 3a–d designate the perpendicular to the given reflecting surface S1, S2, S3, S4, where the position of the given perpendicular is indicated in a small three-dimensional coordinate system. FIGS. 1, 2 and 3 also indicate a lens O with a dashed line; the lens can be positioned in the optical path in front of the first reflecting surface S1 or behind the fourth reflecting surface S4. The figures also show an incoming optical axis A0, a first mirror image A1 of the incoming optical axis A0, the second mirror image A2 of the incoming optical axis A0, the third mirror image A3 of the incoming optical axis A0, and the fourth mirror image A4 of the incoming optical axis A0, which coincides with the outgoing optical axis A5. The basic operation of the reproduction system will next be explained on the basis of the embodiment of FIG. 1. First it should be noted that the reflecting surfaces S1, S2, S3, and S4 are not restricted in their dimensions to the depicted magnitudes, but naturally may be larger or smaller. These dimensions have been chosen in the drawing figures in order to clarify the functioning of the system. For the sake of simplicity, the optical path will be elucidated on the basis of an optical ray which enters the reproduction system along the incoming optical axis A0.

This ray strikes the first reflecting surface S1 along the incoming optical axis A0 in the projection plane and is reflected by said surface S1. The first reflecting surface S1 shown in FIG. 1 is positioned in such a way that the reflected ray and thus the first mirror image A1 of the incoming optical axis A0 also runs along the plane of projection, that is, the incident ray and the ray reflected by the first reflecting surface S1—or the incoming optical axis A0 and its first mirror image A1—define an initial plane. In FIG. 1 this plane corresponds to the plane of projection. Here the angle of incidence, which is established by an incident ray running along the incoming optical axis A0 and by the perpendicular L1 to the first reflecting surface S1, is 60°, and the entire angle α1 established by the incoming optical axis A0 and its first mirror image A1=120°. The position of the perpendicular L1 to the reflecting surface S1 is shown in FIG. 1a. From this figure it will be seen that the perpendicular L1 rests in the projection plane and has an elevation of $\in1=-60°$ relative to the plane of the azimuth (dotted).

The light ray reflected by the first reflecting surface S1 and running along the first mirror image A1 of the incoming optical axis strikes the second reflecting surface S2. This surface S2 is positioned such that the perpendicular L2 (FIG. 1b) to this surface S2 has an azimuth of γ2=109.734° relative to the first plane (projection plane) and an elevation of γ2=64.296° relative to the plane of the azimuth (azimuth plane dotted), as can be seen in FIG. 1b. The ray striking this surface S2 is rotated out of the projection plane by the reflection (FIG. 1), and thus out of the projection plane in the backward direction in the present depiction, while the ray reflected by the first surface S1 and striking the surface S2, or the first mirror image A1 of the incoming optical axis, and the ray reflected by this surface S2, or the second mirror image A2 of the incoming optical axis, encompasses an angle of α2=−90° and define a second plane separate from the first plane (here: plane of projection). Here the orientation of the angle ai is always selected so that it runs in clockwise direction in the projection plane. Consequently there are negative values for several angles αi.

In the further course of the optical path, the light ray reflected by the second reflecting surface S2 and running along the second mirror image A2 of the incoming optical axis strikes the third reflecting surface S3. This surface S3 is positioned such that the perpendicular L3 (FIG. 1b) to this surface S3 has an azimuth of γ3=70.529° relative to the first plane (projection plane) and an elevation of $\in3=16.779°$ relative to the plane of the azimuth, as can be seen in FIG. 1c. The ray striking this surface S3 is rotated by the reflection out of the second plane, which is defined by the ray striking the second surface S2, or by the first mirror image A1 of the incoming optical axis, and by the ray reflected by this surface S2, or the second mirror image A2 of the incoming optical axis; thus, in the present depiction (FIG. 1), the surface S3, viewed in spatial terms, reflects the ray from behind back into the direction of the projection plane. Here the ray reflected by the second surface S2 and striking surface S3, or the second mirror image A2 of the incoming optical axis, and the ray reflected by this surface S3, or the third mirror image A3 of the incoming optical axis, establish an angle of α3=−90°.

Further pursuing the optical path, the light ray intersects the extension of the incoming optical axis. At this point of intersection, the light ray reflected by the third reflecting surface S3 and running along the third mirror image A3 of the incoming optical axis strikes the fourth reflecting surface S4. This surface S4 is positioned such that the perpendicular L4 to said surface S4 has an azimuth of γ4=150° relative to the first plane (here: projection plane) and an elevation of $\in4=-35.260°$ relative to the azimuth plane. The ray striking this surface S4 is reflected in such a way that the reflected light ray, or the fourth mirror image A4 of the incoming optical axis, coincides with the outgoing optical axis A5, which rests on the same straight line as the incoming optical axis A0. In the depiction shown here, the ray, advancing forward from the reflecting surface S4, is reflected in the direction of the outgoing optical axis A5, while the ray reflected by the third surface S3 and striking surface S4, or the third mirror image A3 of the incoming optical axis, and the ray reflected by this surface S4, or the fourth mirror image A4 of the incoming optical axis, describe an angle of $\alpha 4=90°$. The separating distances D12, D23, and D34 between the reflecting surfaces S1 and S2, S2 and S3, and S3 and S4 have a ratio of $(\sqrt{2}):1:1$ in the present embodiment.

The lens O, suggested by the dashed line and positioned in the optical path before the first reflecting surface S1 or after the fourth reflecting surface S4, can be used to correct chromatic defects and/or optical defects of a geometrical nature, e.g., spherical aberration.

In a practical embodiment of the reproduction system, the separating distance D23 may be, e.g., 35–45 mm, more specifically about 40 mm. The other separating distances D12 and D34 are then given by the ratio of the separating distances indicated above. The entire reproduction system may have a length in the direction of the incoming or outgoing optical axis (not the length of the optical path) of 100–130 mm, more specifically about 113.5 mm.

The individual reflecting surfaces S1, S2, S3, and S4 can, for example, be glass surfaces that are metal-coated (e.g., vaporized). In principle, the reproduction system may also include several glass bodies to which the reflecting surfaces are attached. The light will then enter the glass body, will be guided within the glass body, and mirrored at the four reflecting areas, and will exit the glass body. For reasons of technical production it is not possible to provide the reflecting areas on a single glass body, though two or more glass bodies can be attached to each other. Conducting the light in one or several glass bodies has an advantage in that the reflecting surfaces are kept small and the surfaces can be ground with precision; precisely adjustable mounts are thereby eliminated.

The fact that the light can be guided by total reflection in the glass body is bound up with the fact that glass represents the more optically dense medium as compared to the air surrounding the glass body. For example, a glass body of this kind can be manufactured from the commercially available SF1 glass of the Schott company, with a refraction index of $n=1.71$. This naturally applies as well when the reflecting surfaces are designed as discrete surfaces (not as a composite glass body). In that case they can be metal-coated, i.e., given a mirror surface.

FIG. 2 shows another embodiment of a configuration of reflecting surfaces S1, S2, S3 and S4. The first reflecting surface shown in FIG. 2 is positioned in such a way that the reflected ray and thus the first mirror image A1 of the incoming optical axis A0 also runs in the projection plane, and thus that the incident ray and the ray reflected by the first reflecting surface S1, or the incoming optical axis A0 and its first mirror image A1, define a plane. In FIG. 2, as in FIG. 1, this plane corresponds to the plane of projection. Here the angle of incidence which is established by the ray entering along the incoming optical axis A0 and by the perpendicular L1 to the first reflecting surface is 60°, so that the entire angle enclosed by the incoming optical axis A0 and its first mirror image A1 is $\alpha 1=120°$.

The remaining operation of this embodiment of the reproduction system is completely analogous to that already explained on the basis of FIG. 1. As illustrated with respect to FIG. 2 and FIGS. 2a–d, exemplary corresponding angles for the reflecting surface S2 are: $\alpha 2=-90°$, $\gamma 2=109.734°$, $\in 2=64.296°$. For the reflecting surface S3 the angles are: $\alpha 3=-90°$, $\gamma 3=81.548°$, and $\in 3=-4.850°$, and for reflecting surface S4: $\alpha 4=120°$, $\gamma 4=121.482°$, and $\in 4=-16.778°$. The separating distances D12, D23, and D34 between the reflecting surfaces have a ratio of $1:(\sqrt{2}):1$.

A further embodiment of a configuration of reflecting surfaces is depicted in FIG. 3. The functioning of this embodiment is analogous to that of the two other embodiments already explained. The first reflecting surface S1 shown in FIG. 3 is positioned in such a way the reflected ray, and thus the first mirror image A1 of the incoming optical axis A0, also run on the projection plane, so that the incident ray and the ray reflected by the first reflecting surface S1, or the incoming optical axis A and its first mirror image A1, define a plane. In FIG. 3 this plane corresponds, as in FIG. 1 and FIG. 2, to the projection plane. Here the angle of incidence, which is established by the ray running along the incoming optical axis A0 and the perpendicular to the first reflecting surface S1, is 45°, so that the entire angle al is 90°, established by the incoming axis A0 and its first mirror image A1.

As illustrated with respect to FIG. 3 and FIGS. 3a–3d, exemplary corresponding angles for reflecting surface S2 are: $\alpha 2=-90°$, $\gamma 2=138.093°$, $\in 2=45°$. For the reflecting surface S3 the angles are: $\alpha 3=-67.68°$, $\gamma 3=64.082°$, and $\in 3=31.821°$, and for reflecting surface S4: $\alpha 4=90°$, $\gamma 4=154.241°$, and $\in 4=-38.268°$. The separating distances D12, D23, and D34 between the reflecting surfaces have a ratio of $1:0.7:1.1417$.

Further configurations are not shown in separate figures since they are all designed in analogous fashion and function in the same manner. For the embodiment shown in FIG. 2, however, several other possibilities should be mentioned, since the variation in FIG. 2 exhibits a special feature: this variant of the reproduction system can be thought of as two identical half-systems that have been combined. The second half-system, which comprises reflecting surfaces S3 and S4, and is thus the half-system to the right of the separating plane T that runs perpendicular to the projection plane, is produced by the first half-system, comprising reflecting surfaces S1 and S2, in that the first half-system, is first reflected onto the plane T. The half-system reflected onto the separating plane T is then rotated by an angle $\beta$ in the direction of the arrow DW around the outgoing optical axis A5. In the following table, reproduction systems are listed which are produced from a first half-system and a second half-system, where the second half-system is produced from the first half-system by reflecting the first half-system onto the separating plane T and then rotating the first half-system reflected onto the separating plane T around the outgoing optical axis A5. Here rotation occurs around rotating angle $\beta$ in clockwise direction when the entire reproduction system is observed from the outgoing optical axis. In FIG. 2, the reproduction system is therefore observed from the right. Based on the above-described observation with respect to the half-systems it is sufficient to indicate the angles $\gamma 1$ and $\in 1$ and $\gamma 2$ and $\in 2$, as well as the separating distances D12 and the halves D23/2 of the separating distance D23. The angle of rotation $\beta$ by which the first half-system reflected onto the separating plane T is rotated in clockwise direction, and thus in the direction of the arrow DW, around the outgoing optical axis must also be indicated in order to provide the entire reproduction system. The negative indications for the angles 1 indicate that the perpendicular L1 runs below the azimuth plane. For the sake of greater clarity the table also provides the angles α1 and α2 established by the incoming optical axis A0 and its first mirror image A1 and by A1 and the mirror image A2. It can be easily seen that example b) in the table corresponds to the embodiment shown in FIG. 2.

| | α1 | γ1 | ε1 | D12 | α2 | γ2 | ε2 | D23/2 | β |
|---|---|---|---|---|---|---|---|---|---|
| a) | 130° | 0° | −65° | 1 | −90° | 90.135° | 67.491° | 0.7075 | 89.9° |
| b) | 120° | 0° | −60° | 1 | −90° | 109.734° | 64.296° | 0.7071 | 70.53° |
| c) | 110° | 0° | −55° | 1 | −90° | 122.860° | 58.752° | 0.5596 | 47.219° |
| d) | 100° | 0° | −50° | 1 | −90° | 130.71° | 52.065° | 0.285 | 22.416° |
| e) | 120° | 0° | −60° | 1 | −80° | 119.15° | 61.310° | 0.631 | 51.798° |
| f) | 120° | 0° | −60° | 1 | −70° | 126.75° | 57.815° | 0.362 | 24.173° |
| g) | 120° | 0° | −60° | 1 | −100° | 98.243° | 66.56° | 0.7135 | 83.638° |
| h) | 110° | 0° | −55° | 1 | −100° | 114.54° | 62.308° | 0.6603 | 65.537° |

Due to the fact that this kind of reproduction system can be composed of two half-systems, it may also be realized by means of two glass bodies which are combined (e.g., glued) at the plane T.

With this kind of reproduction system—when used, for example, in photographic printers—the image of a half-frame original, which is rotated by 90°, is reproduced or exposed in the same position on the paper tape as an image of a full-frame original for which rotation is not necessary. At the same time, the reproduction system according to the invention exhibits a minimum number of reflecting surfaces, so that expense is minimized particularly with regard to the precise justification of the individual reflecting surfaces. It is particularly expedient to provide a printer both with a reproduction system for originals in full-format—in which the image does not have to be rotated for exposure on the paper—and with a reproduction system for half-frame originals rotated by 90°, which must first be rotated 90° for exposure on the paper. Both options can be provided in a joint reproduction apparatus within the printer, where the reproduction system demanded by the type of original (90° rotation or no rotation) is automatically positioned in the optical path during exposure. This eliminates voluminous means for control of the paper feed to the cutting device, since all copies have a uniform position and width. This in turn increases the efficiency of the printer or the photographic processing path.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. An optical reproduction system comprising:

four successive total reflection surfaces for rotating an image of an object 90° relative to the object to be reproduced on an image plane parallel to a plane of the object, wherein said reflection surfaces establish an optical path having an incoming optical axis and a separate outgoing optical axis, wherein said incoming optical axis and said outgoing optical axis both rest along a single straight line, and wherein an output image from a fourth of said four successive total reflection surfaces is a non-inverted image which is rotated 90° relative to the object.

2. An optical reproduction system according to claim 1, wherein said reflection surfaces include:

a first reflecting surface in the optical path which produces a first mirror image of the incoming optical axis and this first mirror image of the incoming optical axis together with the incoming optical axis defines a first plane, a second reflecting surface that follows the first reflecting surface in the optical path and which produces a second mirror image of the incoming optical axis such that this second mirror image of the incoming optical axis leaves the first plane so that the first and second mirror images of the incoming optical axis define a second plane different from the first plane, a third reflecting surface that follows the second reflecting surface in the optical path and which produces a third mirror image of the incoming optical axis such that this third mirror image of the incoming optical axis leaves the second plane and intersects said single straight line, and a fourth reflecting surface following the third reflecting surface in the optical path which produces a fourth mirror image of the incoming optical axis, said fourth mirror image being produced on the outgoing optical axis.

3. An optical reproduction system according to claim 2, wherein the incoming optical axis defines an angle of incidence of 45° to 60° with respect to a perpendicular to the first reflecting surface, a perpendicular to the second reflecting surface has an azimuth of 45° to 120° relative to the first plane and an elevation of 40° to 70° relative to the azimuth plane, a perpendicular to the third reflecting surface has an azimuth of 60° to 85° relative to the first plane and has an elevation of −10° to 45° relative to the azimuth plane, and a perpendicular to the fourth reflecting surface has an azimuth of 120° to 160° relative to the first plane and an elevation of −15° to −45° relative to the azimuth plane.

4. An optical reproduction system according to claim 3, wherein the incoming optical axis defines an angle of incidence of 60° with respect to the perpendicular to the first reflecting surface, the perpendicular to the second reflecting surface has an azimuth of 109.734° relative to the first plane and an elevation of 64.296° relative to the azimuth plane, the perpendicular to the third reflecting surface has an azimuth of 70.529° relative to the first plane and an elevation of 16.779° relative to the azimuth plane, and the perpendicular to the fourth reflecting surface has an azimuth of 150° relative to the first plane and an elevation of −35.26° relative to the azimuth plane.

5. An optical reproduction system according to claim 4, wherein the ratio of the lengths of the optical paths from the first reflecting surface to the second reflecting surface, from the second reflecting surface to the third reflecting surface, and from the third reflecting surface to the fourth reflecting surface is ($\sqrt{2}$): 1:1.

6. An optical reproduction system according to claim 5, wherein a standardized length defined as 1 of the optical path is about 40 mm.

7. An optical reproduction system according to claim 3, wherein the incoming optical axis defines an angle of incidence of 60° with respect to a perpendicular to the first reflecting surface, a perpendicular to the second reflecting surface has an azimuth of 109.734° relative to the first plane and an elevation of 64.296° relative to the azimuth plane, a perpendicular to the third reflecting surface has an azimuth of 81.548° relative to the first plane and an elevation of −4.850° relative to the azimuth plane, and a perpendicular to the fourth reflecting surface has an azimuth of 121.482° relative to the first plane and an elevation of −16.778° relative to the azimuth plane.

8. An optical reproduction system according to claim 7, wherein a ratio of lengths of optical paths from the first reflecting surface to the second reflecting surface, from the second reflecting surface to the third reflecting surface, and from the third reflecting surface to the fourth reflecting surface is 1:($\sqrt{2}$): 1.

9. An optical reproduction system according to claim 8, wherein a standardized length defined as 1 of the optical path is about 40 mm.

10. An optical reproduction system according to claim 2, wherein the incoming optical axis defines an angle of incidence of 60° with respect to a perpendicular to the first reflecting surface, a perpendicular to the second reflecting surface has an azimuth of 109.734° relative to the first plane and an elevation of 64.296° relative to the azimuth plane, a perpendicular to the third reflecting surface has an azimuth of 81.548° relative to the first plane and an elevation of −4.850° relative to the azimuth plane, and a perpendicular to the fourth reflecting surface has an azimuth of 121.482° relative to the first plane and an elevation of −16.778° relative to the azimuth plane.

11. An optical reproduction system according to claim 10, wherein a ratio of lengths of optical paths from the first reflecting surface to the second reflecting surface, from the second reflecting surface to the third reflecting surface, and from the third reflecting surface to the fourth reflecting surface is 1:($\sqrt{2}$): 1.

12. An optical reproduction system according to claim 11, wherein a standardized length defined as 1 of the optical path is about 40 mm.

13. An optical reproduction system according to claim 2, wherein the incoming optical axis defines an angle of incidence of 45° with respect to the perpendicular to the first reflecting surface, the perpendicular to the second reflecting surface has an azimuth of 138.093° relative to the first plane and an elevation of 45° relative to the azimuth plane, the perpendicular to the third reflecting surface has an azimuth of 64.082° relative to the first plane and an elevation of 31.821° relative to the azimuth plane, and the perpendicular to the fourth reflecting surface has an azimuth of 154.241° relative to the first plane and an elevation of −38.268° relative the azimuth plane.

14. An optical reproduction system according to claim 13, wherein a ratio of lengths of optical paths from the first reflecting surface to the second reflecting surface, from the second reflecting surface to the third reflecting surface, and from the third reflecting surface to the fourth reflecting surface is 1:0.7:1.142.

15. An optical reproduction system according to claim 14, wherein a standardized length defined as 1 of the optical path is about 40 mm.

16. An optical reproduction system according to claim 2, further including: a lens to compensate for chromatic defects or optical defects of a geometric kind, said lens being positioned in front of the first reflecting surface or behind the fourth reflecting surface relative to said optical path.

17. An optical reproduction system according to claim 1, wherein said four reflection surfaces form a first half-system and a second half-system identical to said first half-system, each with two of said four reflection surfaces, said second half-system being arranged with a configuration derived from a configuration of the first half-system with the first half-system being reflected onto a separating plane vertically located with respect to the optical path and a reflection of the first half-system then being rotated a given angle around the outgoing optical axis.

18. An optical reproduction system according to claim 1, wherein each of said reflection surfaces is a metal-coated glass surface formed with glass having a refraction index of about 1.7.

* * * * *